(12) United States Patent
Heuer et al.

(10) Patent No.: US 9,688,156 B2
(45) Date of Patent: Jun. 27, 2017

(54) METHOD AND SYSTEM FOR COMMUNICATION BETWEEN A VEHICLE AND A CHARGING STATION FOR UNLOCKING MECHANICAL CHARGING CABLE COUPLING

(71) Applicant: SIEMENS AKTIENGESELLSCHAFT, Munich (DE)

(72) Inventors: Joerg Heuer, Oberhaching (DE); Martin Winter, Rosenheim (DE)

(73) Assignee: Siemens Aktiengesellschaft, Munich (DE)

( * ) Notice: Subject to any disclaimer, the term of this patent is extended or adjusted under 35 U.S.C. 154(b) by 186 days.

(21) Appl. No.: 14/580,666

(22) Filed: Dec. 23, 2014

(65) Prior Publication Data

US 2015/0108947 A1    Apr. 23, 2015

Related U.S. Application Data

(62) Division of application No. 13/384,369, filed as application No. PCT/EP2010/059435 on Jul. 2, 2010, now Pat. No. 9,227,519.

(30) Foreign Application Priority Data

Jul. 15, 2009   (DE) .................. 10 2009 033 305
Mar. 12, 2010   (DE) .................. 10 2010 011 162

(51) Int. Cl.
*B60L 11/18*       (2006.01)
*H01R 13/639*      (2006.01)

(52) U.S. Cl.
CPC ......... *B60L 11/1816* (2013.01); *B60L 11/184* (2013.01); *B60L 11/1818* (2013.01);
(Continued)

(58) Field of Classification Search
CPC .............. B60L 11/1816; B60L 11/1818; B60L 11/1825; B60L 11/1838; B60L 11/184; B60L 11/1846
(Continued)

(56) References Cited

U.S. PATENT DOCUMENTS

| | | | |
|---|---|---|---|
| 4,532,418 A | 7/1985 | Meese et al. |
| 5,429,524 A | 7/1995 | Wakata et al. |

(Continued)

FOREIGN PATENT DOCUMENTS

| | | |
|---|---|---|
| CN | 1372701 A | 10/2002 |
| CN | 101400542 A | 4/2009 |

(Continued)

OTHER PUBLICATIONS

Lazzaro Volker: "Ladesysteme fuer Elektrofahrzeuge", Feb. 18, 2009 (Feb. 18, 2009), XP055059064 URL:http://www.emfm.de/downloads/spezifikation-mennekes-aldesysteme-rev10.pdf [found Apr. 10, 2013]—English abstract.

(Continued)

*Primary Examiner* — Richard Isla Rodas
*Assistant Examiner* — Manuel Hernandez
(74) *Attorney, Agent, or Firm* — Laurence Greenberg; Werner Stemer; Ralph Locher

(57) ABSTRACT

A method for communicating between an electric vehicle and a charging station for electrically charging at least one energy storage device of the electric vehicle. The electric vehicle is connected to the charging station during the charging process by a lockable mechanical coupling between a terminal of charging cable connected to the vehicle and a terminal of the charging station. Charging current is fed from the charging station through the charging cable. Information is transferred in the course of the charging process based on a communication between the electric (Continued)

vehicle and the charging station. The information includes a signal transmitted from the electric vehicle to the charging station for locking and/or unlocking the mechanical coupling. The signal triggers the locking and/or unlocking of the mechanical coupling between the terminal of the charging cable and the terminal at the charging station.

17 Claims, 2 Drawing Sheets

(52) U.S. Cl.
CPC ....... *B60L 11/1825* (2013.01); *B60L 11/1838* (2013.01); *B60L 11/1846* (2013.01); *B60L 2230/12* (2013.01); *B60L 2270/30* (2013.01); *B60L 2270/32* (2013.01); *B60L 2270/34* (2013.01); *H01R 13/639* (2013.01); *H01R 13/6397* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .......................................... 320/109
See application file for complete search history.

(56) References Cited

U.S. PATENT DOCUMENTS

| | | | |
|---|---|---|---|
| 5,536,173 A | 7/1996 | Fujitani et al. | |
| 5,563,491 A * | 10/1996 | Tseng | B60L 11/1816 194/904 |
| 5,934,918 A | 8/1999 | Wuechner | |
| 6,380,637 B1 | 4/2002 | Hsu et al. | |
| 8,000,858 B2 | 8/2011 | Tonegawa et al. | |
| 8,487,584 B2 * | 7/2013 | Taylor-Haw | 320/109 |
| 2009/0082916 A1 | 3/2009 | Tanaka | |
| 2009/0286414 A1 * | 11/2009 | Ohtomo | B60L 11/1803 439/299 |
| 2010/0013433 A1 * | 1/2010 | Baxter | B60L 11/1816 320/109 |
| 2010/0013434 A1 * | 1/2010 | Taylor-Haw | B60L 11/1818 320/109 |
| 2010/0039069 A1 | 2/2010 | Niwa et al. | |
| 2010/0228405 A1 * | 9/2010 | Morgal | B62H 3/02 701/2 |
| 2011/0034053 A1 | 2/2011 | Matsumoto et al. | |
| 2012/0071017 A1 * | 3/2012 | Gaul | B60L 11/1825 439/304 |
| 2012/0135634 A1 * | 5/2012 | Gaul | B60L 11/1818 439/488 |

FOREIGN PATENT DOCUMENTS

| | | |
|---|---|---|
| DE | 19642687 A1 | 4/1998 |
| EP | 0635908 A2 | 1/1995 |
| EP | 0646995 A2 | 5/1995 |
| WO | 2009014228 A1 | 1/2009 |

OTHER PUBLICATIONS

EV Charging Systems Committee: "(R) SAE Electric Vehicle Conductive Charge Coupler J1772", , vol. J1772, No. Rev. Nov. 2001, Oct. 1, 1996 (Oct. 1, 1996), URL:http://bzwxw.com/soft/UploadSoft/new5/SAE—J1772-2001.pdf [found Jan. 2, 2012].

* cited by examiner

METHOD AND SYSTEM FOR COMMUNICATION BETWEEN A VEHICLE AND A CHARGING STATION FOR UNLOCKING MECHANICAL CHARGING CABLE COUPLING

CROSS-REFERENCE TO RELATED APPLICATION

This application is a divisional of application Ser. No. 13/384,369, now U.S. Pat. No. 9,227,519 B2, which was a §371 national stage of copending international patent application PCT/EP2010/059435, filed Jul. 2, 2010, which designated the United States; this application also claims the priority, under 35 U.S.C. §119, of German patent applications Nos. 10 2010 011 162.7, filed Mar. 12, 2010, and 10 2009 033 305.3, filed Jul. 15, 2009; the prior applications are herewith incorporated by reference in their entirety.

BACKGROUND OF THE INVENTION

Field of the Invention

The invention relates to a method for communicating between an electric vehicle and a charging station for electrically charging at least one energy storage device of the electric vehicle and to a corresponding communication system and to an electric vehicle and to an electrical charging station.

The electrical energy storage devices of electric vehicle can nowadays be recharged at charging stations provided for this purpose. For this, the vehicle user connects his vehicle via a charging cable to the charging station and initializes the charging operation in a suitable manner, for example by means of authentication using a code at the charging station. Over the course of the charging operation, information relating to the charging operation is transmitted in the process via one or more communication channels between the vehicle and the charging station.

In order to avoid unauthorized removal of the charging cable from the charging station during the charging operation, it is known to equip the terminal of the charging cable which is connected to a corresponding terminal of the charging station during charging with a locking apparatus, which locks the terminal of the charging cable at the charging station by means of a key or by means of a numerical code being input. This type of locking has proven impracticable for extensive use of electric vehicles, however, since keys or numerical codes corresponding to a large number of users, possibly also for different operators of charging stations, need to be issued for this purpose. The object of the invention is therefore to provide a simple possible way of locking or unlocking the terminal of the charging cable at a terminal of the charging station during the charging operation of an electric vehicle at a charging station.

SUMMARY OF THE INVENTION

This object is achieved by the method as claimed or the system as claimed or the charging station as claimed. Developments of the invention are defined in the dependent claims.

In the method according to the invention for communicating between an electric vehicle and a charging station, the electric vehicle is connected, during the charging operation, to the charging station via a lockable mechanical coupling between a terminal of a charging cable connected to the electric vehicle and a terminal of the charging station in order to supply charging current from the charging station, via the charging cable, to at least one electrical energy storage device of the electric vehicle. Over the course of the charging operation, information is transmitted on the basis of a communication between the electric vehicle and the charging station. The term "over the course of the charging operation" has a broad interpretation in this context and in particular includes the transmission of information during and/or prior to and/or after a charging operation, for example for initiating or ending the charging operation.

The method according to the invention is characterized by the fact that the transmitted information includes a signal transmitted from the electric vehicle to the charging station for unlocking the mechanical coupling, with the unlocking of the mechanical coupling between the terminal of the charging cable and the terminal of the charging station being triggered via the signal in the charging station.

By virtue of the method according to the invention, remote locking or remote unlocking of the terminal of the charging cable at a corresponding terminal of the charging station is achieved in a suitable manner via the electric vehicle. This locking or unlocking is brought about via a communication between the vehicle and the charging station, with the result that it is not necessary according to the invention to implement locking or unlocking directly at the charging station by means of a corresponding key or numerical code.

According to the invention, the signal for unlocking or locking the mechanical coupling can be performed in various ways, in particular signals or signal sequences which are already known can be used for the signal and are now interpreted in the charging station such that locking or unlocking of the terminal of the charging cable at the charging station is achieved thereby. However, it is also possible for separate control signals intended exclusively for the operation of locking or unlocking to be transmitted from the vehicle to the charging station for locking or unlocking in order to trigger the locking or unlocking there.

The lockable mechanical coupling between the terminal of the charging cable and the terminal of the charging station can have any desired configuration. In a preferred variant, this coupling is a plug-type connection, in which a plug of the charging cable is plugged into a corresponding socket in the charging station. Locking can thus be brought about by a suitable locking apparatus, for example via one or more pins engaging in corresponding slots. Locking is in this case generally understood to mean fastening of the terminal of the charging cable at the terminal of the charging station such that an unauthorized user cannot disconnect these terminals from one another, or can only do so with force.

In a particularly preferred embodiment of the method according to the invention, the signal for locking and/or unlocking the mechanical coupling is coupled to a signal relating to the charging operation and/or state of charge of the at least one energy storage device of the electric vehicle, in particular to a signal relating to the start and/or end of the charging operation and/or relating to application and/or safety-disconnection of a voltage on the charging cable by the charging station. As an alternative or in addition, however, there is also the possibility of the signal for locking and/or unlocking the mechanical coupling being configured in such a way that it is decoupled from a signal relating to the charging operation and/or state of charge of the at least one energy storage device of the electric vehicle.

One or more communication connections with any desired configuration can be used for communication between the electric vehicle and the charging station. In particular, communication connections which are already known from the prior art can also be used. In a preferred variant, the signal for locking and/or unlocking the mechanical coupling is transmitted via at least one of the following communication connections:

a PLC (power line communication) communication connection via one or more lines of the charging cable which may also be able to conduct current;

a monitoring connection which is isolated from the current-conducting lines in the charging cable, such as via the pilot pin described further below, for example, which is used to provide a communication path parallel to the current-conducting lines in the charging cable;

a communication connection, which is separate from the charging cable, such as by means of radio transmission based on WLAN, Bluetooth or the like, for example.

When using a communication connection which is separate from the charging cable or in the case of the PLC communication connection, data transmission is preferably performed on a packet basis. Accordingly, the transmission of information via the monitoring connection which is separate from the current-conducting lines in the charging cable is preferably performed by means of pulse-width modulation and amplitude modulation. In a particularly preferred embodiment of the signal for locking or unlocking the mechanical coupling via the monitoring connection, a plurality of states of the electric vehicle are indicated to the charging station via this monitoring connection, with the states including a first state, which indicates that the electric vehicle is ready for charging at least one of its energy storage devices, and a second state, which indicates that the at least one energy storage device of the electric vehicle is being charged via the charging cable, with a change between the first and second states representing a signal via which the locking of the mechanical coupling between the terminal of the charging cable and the terminal of the charging station is triggered, and a change from the second state into the first state representing a signal via which the unlocking of the mechanical coupling between the terminal of the charging cable and the terminal of the charging station is triggered. The first and second states can in this case possibly also be signaled using methods already known from the prior art. In particular, the first or second state can represent the "ready for charging" and "charging" states, respectively, which are defined in the standard ISO/IEC 61851, Part 1, still in development, and in the standard SEA J1772, already concluded. These standards regulate the communication between an electric vehicle and a charging station.

In order to avoid unauthorized locking or unlocking of the mechanical coupling, in a preferred embodiment of the method according to the invention, over the course of the communication between the electric vehicle and the charging station, authentication of the electric vehicle with respect to the charging station is performed, the signal for locking and/or unlocking the mechanical coupling being transmitted from the electric vehicle to the charging station only when authentication is successful. In a particularly preferred embodiment of the variants just described, authentication data for performing the authentication are transmitted via the above-described monitoring connection in the charging cable, and then the authentication is performed via the PLC communication connection in the charging cable and/or the communication connection which is isolated from the charging cable. The authentication data can in this case in particular include identification of the vehicle and/or of the vehicle user or corresponding digital keys and/or certificates, which are then used for authentication.

According to the invention, the signal for locking and/or unlocking the mechanical coupling can be triggered in various ways from the vehicle. For example, the signal can be performed in response to the actuation of the central locking of the vehicle. In particular, when the vehicle is locked by means of the central locking, the locking of the mechanical coupling is triggered and, when the vehicle is opened via the central locking, the unlocking of the mechanical coupling is triggered. It is likewise possible for the signal for locking and/or unlocking the mechanical coupling to be performed in response to the actuation of a switch in the electric vehicle by a user.

In addition to the above-described method, the invention also relates to a system for communicating between an electric vehicle and a charging station for electrically charging at least one energy storage device of the electric vehicle, the electric vehicle being connected, during the charging operation, between a terminal of a charging cable connected to the electric vehicle and a terminal of the charging station via a lockable mechanical coupling in order to supply charging current from the charging station via the charging cable to the at least one energy storage device. In this case, the system comprises a first communication control unit provided for the electric vehicle and a second communication control unit provided for the charging station, with information being transmitted via the first and second communication control units during operation of the system over the course of the charging operation on the basis of a communication between the electric vehicle and the charging station. The first and second communication control units are in this case configured such that the information transmitted includes a signal for locking and/or unlocking the mechanical coupling generated by the first communication control unit, with locking and/or unlocking of the mechanical coupling between the terminal of the charging cable and the terminal of the charging station being triggered by the second communication control unit via the signal.

The above-described system is preferably configured such that one or more variants of the method according to the invention can be implemented using the system.

The invention also relates to an electric vehicle for use in the above-described method according to the invention, comprising at least one energy storage device, it being possible for the electric vehicle to be connected, during the charging operation, to a charging station for electrically charging the at least one energy storage device via a lockable mechanical coupling between a terminal of a charging cable connected to the electric vehicle and a terminal of the charging station in order to supply charging current from the charging station, via the charging cable, to the at least one energy storage device, with it being possible for information to be transmitted to the charging station over the course of the charging operation on the basis of a communication between the electric vehicle and the charging station from a communication control unit of the electric vehicle. The communication control unit is in this case configured such that it can transmit a predetermined signal, intended exclusively for locking and/or unlocking the mechanical coupling, to the charging station in order to trigger locking and/or unlocking of the mechanical coupling between the terminal of the charging cable and the terminal of the charging station in the charging station. As has already been described above, the predetermined signal can be transmitted by the communication control unit, for example on actuation of the central locking of the electric vehicle and/or a switch in the electric vehicle.

Furthermore, the invention relates to a charging station for use in the above-described method according to the invention. In this case, the charging station is used for electrically charging at least one energy storage device of an electric vehicle, with the electric vehicle being connected, during the charging operation, to the charging station via a lockable mechanical coupling between a terminal of a charging cable connected to the electric vehicle and a terminal of the charging station in order to supply charging current from the charging station, via the charging cable, to the at least one energy storage device. In this case, the charging station comprises a communication control unit, to which information can be transmitted over the course of the charging operation on the basis of a communication between the electric vehicle and the charging station. The communication control unit is in this case configured in such a way that it triggers locking and/or unlocking of the mechanical coupling between the terminal of the charging cable and the terminal of the charging station on reception of a predetermined signal transmitted from the electric vehicle to the charging station.

Exemplary embodiments of the invention will be described in detail below with reference to the attached drawings.

DETAILED DESCRIPTION OF THE INVENTION

Figure 1:
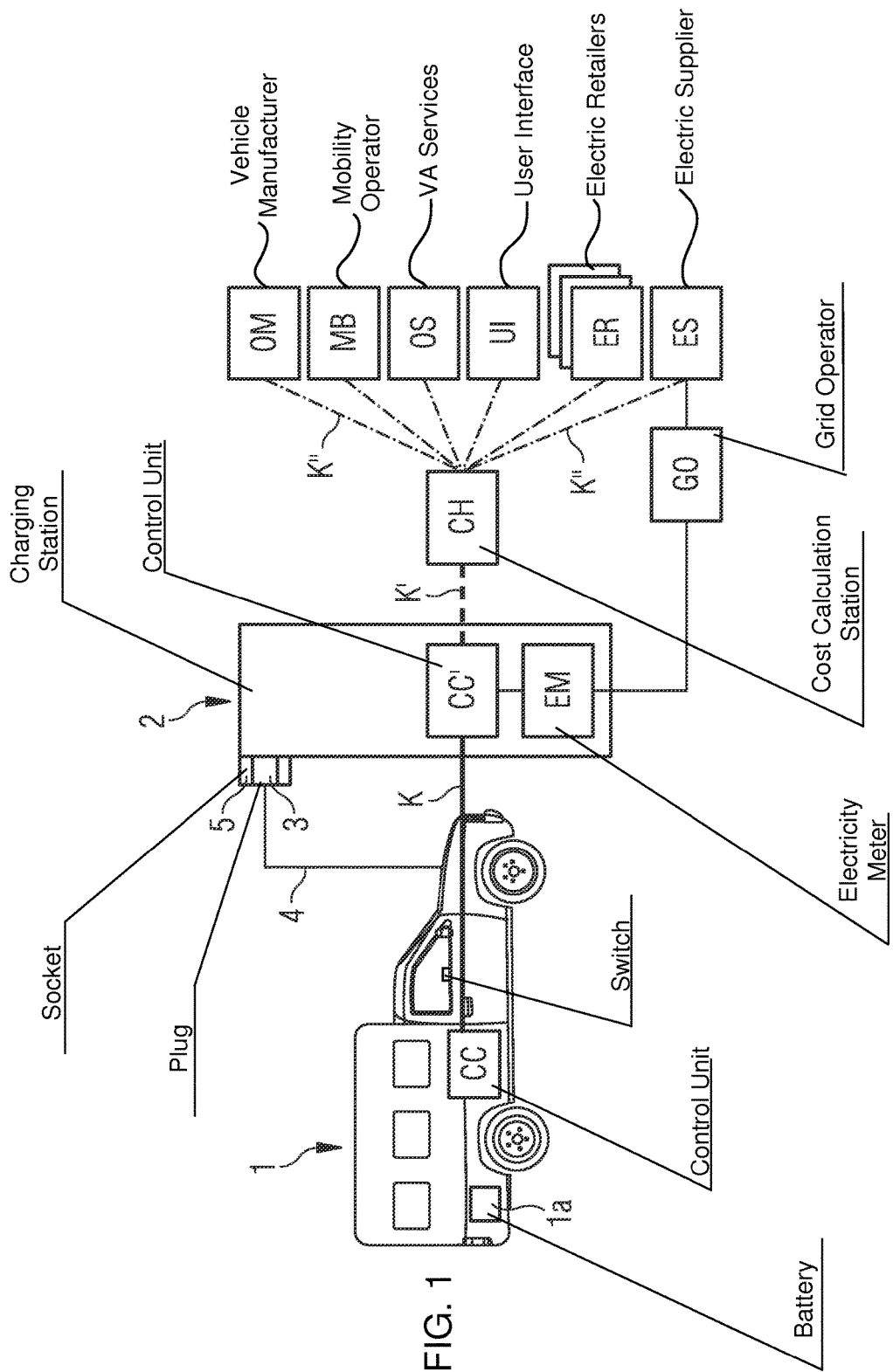
FIG. 1 shows a schematic illustration of the communication between a charging station and an electric vehicle and further components, with it being possible for the method according to the invention to be used for the communication between the charging station and the vehicle.

In order to implement an infrastructure for charging the batteries of an electric vehicle, the standard ISO/IEC 61851 and ISO/IEC 15118 is being developed at present and is intended to regulate the communication between an electric vehicle and a corresponding charging station for electrically charging the battery of the vehicle. The following embodiments are described with reference to this standard. FIG. 1 illustrates schematically the communication between an electric vehicle 1 and a corresponding charging station 2, with it being possible for the charging station 2 to also communication with further logic components. As shown in FIG. 1, the electric vehicle 1 comprises a battery 1a and a communication control unit CC. This communication control unit CC communicates with a corresponding communication control unit CC' within a charging station or a charging column 2. The communication between the control units CC and CC' is illustrated schematically by the continuous line K. This communication needs to be completely standardized in accordance with the families of standards ISO/IEC 61851 and ISO/IEC 15118.

As shown in FIG. 1, the vehicle is connected to a corresponding socket 5 of the charging column 2 via a plug 3 of a charging cable 4. In accordance with the scenario illustrated, a driver wishing to charge the battery 1a of his electric vehicle 1 has plugged the vehicle onto the charging column 2 via the charging cable 4 in order to supply charging current in this way via the charging cable to the battery 1a. Over the course of the charging operation, the communication K takes place between the vehicle 1 and the charging station 2, with it being possible for the communication to take place via various communication paths, as will be explained in more detail further below.

In order to provide the current drawn by the vehicle to the vehicle owner in a suitable manner and to charge the vehicle owner for this current, further components are also provided, as shown in FIG. 1. The electrical energy is provided to the charging column 2 via a grid operator GO, with the grid operator drawing the energy from an electricity supplier or power provider ES. The energy drawn from the charging station 2 is in this case detected by an electricity meter EM within the charging station. The cost of the energy required for charging the battery of the vehicle 1 is calculated via a cost calculation station CH in a suitable manner, with the cost calculation station communicating with the communication control unit CC' of the charging station 2 for this purpose, as is indicated by the dashed arrow K'. This communication K' is regulated on a message plane by the standard ISO/IEC 15118.

The cost calculation station CH can communicate with further components, with the communication with the further components being indicated by dashed lines, which are only sometimes provided with reference symbols K", for reasons of clarity. The component OM in this case represents the original manufacturer of the vehicle 1. The component MB relates to a mobility operator, for example rental company of a fleet of vehicles to which the vehicle 1 also belongs. Further value-added services of any desired form are also provided via the component OS. The component UI is a user interface, for example a mobile telephone of the vehicle owner 1, via which information is transmitted to the vehicle owner from the cost calculation station. The component ER relates to one or more electricity retailers, via which current can be drawn as an alternative or in addition to the energy supplier ES illustrated. The communication K" with the further components is not subject to the standardization in accordance with standard ISO/IEC 15118. The communication between the cost calculation station CH and the charging station 2 or the further components is not essential to the method according to the invention, with the result that no further details are given regarding these communication paths.

Figure 2:
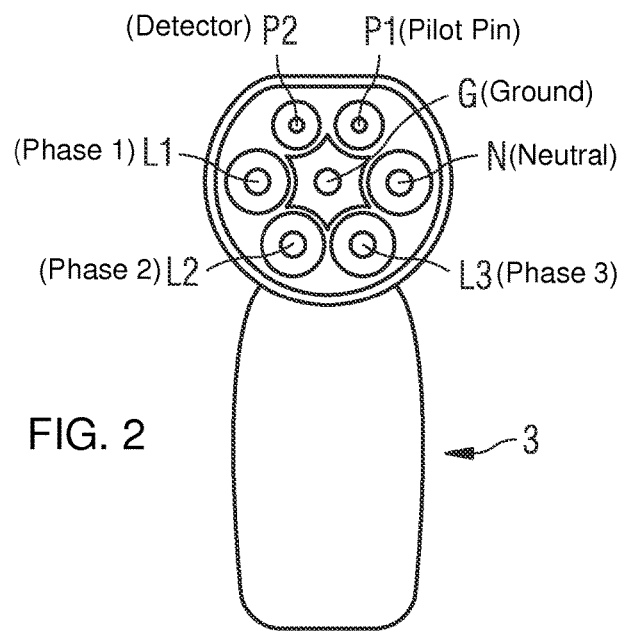
FIG. 2 shows a schematic illustration of the design of the plug of a charging cable for connection to a charging station, it being possible for the plug to be locked in the charging station with the aid of the method according to the invention.

In the embodiment described here, a charging cable with a standard plug 3 is used for charging the vehicle 1 at the charging station 2, said plug having the design shown in plain view in FIG. 2. For the electrical supply of the three-phase charging current, the plug contains the three pins L1, L2 and L3 and the neutral conductor pin N and the grounding pin G. Furthermore, the plug comprises a control pin P1, which is also referred to as the pilot pin, and a further pin P2, which is used to detect, via an electrical resistance, whether or not the plug 3 has been plugged into a corresponding socket 5 of the charging station. The plug 3 can be locked in the socket 5 via a corresponding locking apparatus to prevent unauthorized removal, with the locking apparatus not being shown in the figures. Such a locking apparatus is known from the prior art and can be realized, for example, by virtue of pins corresponding to the charging station being removed from the socket for locking purposes and engaging in slots provided in the plug. The pins or slots can in this case be arranged at uniform distances along the outer circumference of the plug 3. In a preferred embodiment, three pins or slots arranged at an angle of 60° over the circumference of the plug are used.

Conventionally, the locking of the plug 3 in the socket 5 of the charging station 2 is performed by the vehicle owner inputting a corresponding code at the charging station. The aim of the method according to the invention is to bring about locking or unlocking on the basis of the communication K between the vehicle 1 and the charging station 2. For this purpose, a suitable signal is transmitted from the control unit CC of the vehicle to the control unit CC' of the charging station, with the control unit CC' triggering the locking or unlocking of the plug 3 in the socket 5 on reception of this signal.

Figure 3:
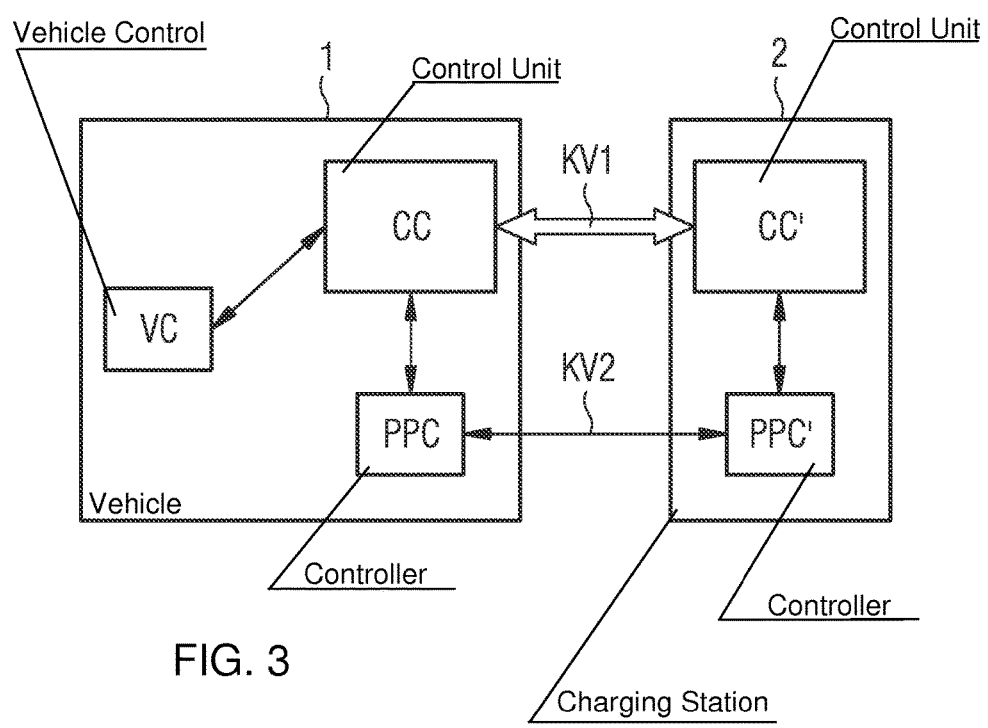
FIG. 3 shows an illustration of a communication between a communication control unit in an electric vehicle and a communication control unit in a charging station for illustrating possible variants of the method according to the invention.

FIG. 3 shows various variants for how the signal for locking or unlocking the plug 3 in the socket 5 can be performed. FIG. 3 shows a schematized illustration once again of the communication control unit CC on the side of the vehicle 1 and the communication control unit CC' on the side of the charging column 2. The communication control unit CC in the vehicle communicates with further components in the vehicle which are indicated by way of example by the block VC. These components include, inter alia, a charger for the battery of the vehicle and a battery management system. In the embodiment shown in FIG. 3, the communication control unit CC also communicates with the communication control unit CC' of the charging station 2 via a first communication connection KV1. Furthermore, the communication control unit communicates with the communication control unit CC' via a second communication connection KV2, with a controller PPC interposed in the circuit on the side of the vehicle 1 and a controller PPC' interposed in the circuit on the side on the charging station 2. The communication connection KV2 is in this case the connection between the vehicle 1 and the charging station 2 which is produced via the pilot pin P1 of the plug 3. The communication connection is managed via the controller PPC on the side of the vehicle 1 and the controller PPC' on the side of the charging station 2, with it being possible for the two controllers to also be interpreted as part of the communication control units CC and CC', respectively.

Conventionally, basic information which is required over the course of the charging operation is transmitted via the communication connection KV2. The information transmitted is in particular information as to whether the plug has been plugged into a charging column (determined via the pin P2), which charging mode from a specific number of charging modes has been selected and which state the vehicle is in. Furthermore, over the course of the communication via the connection KV2, identifications or authentication data, such as corresponding keys, for example, can be transmitted, and these are then used for the communication described further below via the connection KV1 for authorization or authentication of the vehicle 1 with respect to the charging station 2.

In one variant of the method according to the invention, the communication connection KV2 is also used to signal that the plug 3 in the charging station should be locked or unlocked. In one embodiment, this information can be provided, for example, by a change between the signaled vehicle states "ready for charging" and "charging". In the above-described standard IEC 61851, Part 1, Annex A, corresponding vehicle states are already transmitted via the communication connection KV2. These states include, in addition to the "ready for charging" and "charging" states, the state "disconnected", which indicates that the plug is not connected to the charging station. The state "ready for charging" in this case represents a state in which the charging of the battery of the electric vehicle is possible, but the charging operation has not yet been started. The state "charging" represents a charging operation of the battery of the electric vehicle which has been performed at that time. The state "disconnected" relates to a state in which the electric vehicle is not connected to the charging station. The transmission of information relating to these three states is performed in this case via pulse-width modulation, with the mentioned three states being communicated from the vehicle to the charging station over corresponding voltage levels on the positive half-cycle of the pulse-width-modulated signal. Furthermore, the information regarding the power which is provided from the charging station for charging the battery is transmitted to the vehicle via the pulse width from the charging station. The three above-mentioned states are also defined in the already adopted standard SEA J1772 for communication between a vehicle and a charging station and can also be used, in the context of this standard, for signaling locking or unlocking of the plug of the charging cable in the charging station.

In a preferred variant of the signal for locking or unlocking by means of the states "ready for charging" and "charging", locking of the plug is signaled by virtue of a change from the state "ready for charging" to the state "charging", whereupon the charging station locks the plug in the socket. Unlocking can be signaled in a reverse manner by virtue of a change from the state "charging" to the state "ready for charging", whereupon the charging station unlocks the plug. In this case other variants of the signal for locking or unlocking the plug are also conceivable, for example a separate, dedicated control signal for locking or unlocking can also be transmitted via the connection KV2.

In the exemplary embodiment shown in FIG. 3, the signal for locking or unlocking the plug can also be performed via the further illustrated communication connection KV1. This communication connection represents a higher-order communication connection between the communication control units CC and CC' as connection KV2. The connection KV1 can represent, for example, a PLC communication (power line communication) via a possibly also current-conducting line in the charging cable. There is likewise the possibility of a communication channel which is separate from the charging cable, for example radio transmission (in particular via WLAN or Bluetooth) being used for data interchange. In particular, authentication of the vehicle 1 via the charging station 2 takes place via the communication connection KV1, with the authentication data transmitted via the communication connection KV2 being used for this purpose as well. Further information for specific charging operations can also be interchanged via the communication connection KV1, in particular charging profiles, the state of charge of the battery and further control parameters. In the context of the invention, this communication connection KV1 can also be used, if appropriate, for signaling locking or unlocking of the plug in a suitable manner to the charging station.

The transmission of the signal for locking or unlocking the plug can be coupled to various actions implemented in the vehicle. For example, the signal can be coupled to the central locking of the vehicle, with the result that the unlocking or locking of the plug is also signaled when the vehicle is opened or closed. There is likewise the possibility of unlocking or locking being initiated explicitly by the vehicle user by a switch in the vehicle, in analogy to a switch for locking or unlocking the petrol flap of the vehicle. In general, the signal for locking or unlocking the plug can be transmitted in a manner coupled to a signal for the charging operation, for example coupled with the signal for the start and end of the charging operation or with the signal for application or safety-disconnection of the voltage to or from the plug contacts of the plug 3. The signal for locking or unlocking can also be transmitted separately from a signal relating to the charging operation.

The method according to the invention described above has the advantage that the locking or unlocking of a plug in the charging station can now be triggered remotely from the vehicle. It is thus no longer necessary for the driver of the vehicle to be authorized separately at the charging station in order to trigger locking or unlocking of the plug via a pin code, for example.

The invention claimed is:

1. A communication method between an electric vehicle and a charging station,
    wherein, during a charging operation for electrically charging the electric vehicle, the electric vehicle is connected to the charging station via a lockable mechanical coupling between a terminal of a charging cable connected to the electric vehicle and a terminal of the charging station, and charging current is supplied from the charging station to at least one energy storage device of the electric vehicle through the charging cable,
    the method comprising:
    transmitting information over a course of the charging operation for a communication between the electric vehicle and the charging station;
    using one or more of the following communication connections for the communication between the electric vehicle and the charging station:
    a power line communication (PLC) connection through one or more current-conducting lines of the charging cable;
    a monitoring connection that is isolated from the current-conducting lines in the charging cable; and
    a communication connection which is isolated from the charging cable;
    indicating via one of the communication connections a plurality of states of the electric vehicle, the states including a first state, which indicates that the electric vehicle is ready for charging the at least one energy storage device, and a second state, which indicates that the at least one energy storage device of the electric vehicle is being charged via the charging cable, with a change between the second state and the first state representing a signaling by way of which the unlocking of the mechanical coupling between the terminal of the charging cable and the terminal of the charging station is triggered.

2. The method according to claim 1, which comprises coupling the signaling for unlocking the mechanical coupling to a signal relating to at least one of the charging operation or a state of charge of the energy storage device.

3. The method according to claim 2, which comprises coupling the signaling for unlocking the mechanical coupling to a signal relating to at least one of a start of the charging operation, an end of the charging operation, an application and/or safety-disconnection of a voltage on the charging cable by the charging station.

4. The method according to claim 1, wherein the signaling for unlocking the mechanical coupling is decoupled from a signal relating to the charging operation and to a signal relating to a state of charge of the at least one energy storage device of the electric vehicle.

5. The method according to claim 4, which comprises transmitting authentication data for performing an authentication via the monitoring connection in the charging cable, and then performing the authentication via at least one of the PLC communication connection in the charging cable or the communication connection that is isolated from the charging cable.

6. The method according to claim 1, which comprises communicating by way of the information transmission via the PLC communication connection on a packet basis or the communication connection that is isolated from the charging cable on a packet basis, and/or transmitting information via the monitoring connection in the charging cable by way of pulse-width modulation or amplitude modulation.

7. The method according to claim 1, which comprises transmitting signals through a wireless communication connection.

8. The method according to claim 1, which comprises, over the course of the communication between the electric vehicle and the charging station, performing an authentication of the electric vehicle with respect to the charging station, and transmitting a signal for unlocking the mechanical coupling from the electric vehicle to the charging station only when authentication is successful.

9. The method according to claim 1, which comprises transmitting a signal for unlocking the mechanical coupling in response to an actuation of a central locking of the electric vehicle.

10. The method according to claim 1, which comprises transmitting a signal for unlocking the mechanical coupling in response to an actuation of a switch in the electric vehicle.

11. An electric vehicle configured for use in the method according to claim 1, the electric vehicle comprising:
    at least one energy storage device;
    a connection wherein the electric vehicle is connected, during a charging operation, to a charging station for electrically charging said at least one energy storage device by way of a lockable mechanical coupling between a terminal of a charging cable connected to the electric vehicle and a terminal of the charging station, whereupon charging current is supplied from the charging station through the charging cable and to the at least one energy storage device;
    a first communication control unit configured to exchange information with a second communication control unit of the charging station during a course of the charging operation on the basis of a communication between the electric vehicle and the charging station via a communication connection between said first and second communication control units selected from the group consisting of:
    a power line communication (PLC) connection through one or more current-conducting lines of the charging cable;
    a monitoring connection that is isolated from current-conducting lines in the charging cable; and
    a communication connection that is isolated from the charging cable;
    wherein said monitoring connection indicates a plurality of states of the electric vehicle, the states including a first state, indicating that the electric vehicle is ready for charging at least one energy storage device, and a second state, indicating that the at least one energy storage device of the electric vehicle is being charged via the charging cable, and wherein a change from the second state to the first state represents a signaling that triggers the unlocking of the mechanical coupling between the terminal of the charging cable and the terminal of the charging station; and said first communication control unit being configured such that the information transmitted between the first and second communication control unit includes the signaling for unlocking the mechanical coupling.

12. The electric vehicle according to claim 11, wherein said communication control unit transmits the predetermined signal upon one or both of an actuation of the central locking of the electric vehicle or a switch in the electric vehicle.

13. The method according to claim 1, wherein the information includes the signaling for unlocking the mechanical coupling, to thereby trigger in the charging station the unlocking of the mechanical coupling between the terminal of the charging cable and the terminal of the charging station.

14. The method according to claim 1, wherein the indicating step comprises indicating the plurality of states of the electric vehicle via the monitoring connection.

15. A system for communication between an electric vehicle and a charging station and electrically charging at least one energy storage device of the electric vehicle, wherein the electric vehicle is connected, during a charging operation, to the charging station via a lockable mechanical coupling between a terminal of a charging cable connected to the electric vehicle and a terminal of the charging station in order to supply charging current through the charging cable from the charging station to the at least one energy storage device, the system comprising:

a first communication control unit for the electric vehicle;

a second communication control unit for the charging station;

at least one communication connection between said first and second communication control units selected from the group consisting of:

a power line communication (PLC) connection through one or more current-conducting lines of the charging cable;

a monitoring connection that is isolated from the current-conducting lines in the charging cable; and a communication connection which is isolated from the charging cable;

with information being transmitted via the first and second communication control units during operation of the system over the course of the charging operation based on the communication between the electric vehicle and the charging station;

wherein said monitoring connection indicates a plurality of states of the electric vehicle, the states including a first state, indicating that the electric vehicle is ready for charging the at least one energy storage device, and a second state, indicating that the at least one energy storage device of the electric vehicle is being charged via the charging cable, and wherein a change from the second state to the first state triggers an unlocking of the mechanical coupling between the terminal of the charging cable and the terminal of the charging station; and wherein said second communication control unit is configured to trigger the unlocking of the mechanical coupling between the terminal of the charging cable and the terminal of the charging station in response to the change from the second state to the first state.

16. The system according to claim 15, wherein the system is configured to carry out and implement a method comprising the following steps:

transmitting information over a course of the charging operation for a communication between the electric vehicle and the charging station;

thereby transmitting the signal from the electric vehicle to the charging station for unlocking the mechanical coupling, to thereby trigger in the charging station the unlocking of the mechanical coupling between the terminal of the charging cable and the terminal of the charging station.

17. A charging station for electrically charging at least one energy storage device of an electric vehicle, the charging station comprising:

a charging station terminal for connection, via a lockable mechanical coupling, with a terminal of a charging cable connected to the electric vehicle, wherein the electric vehicle is connected via the lockable mechanical coupling in order to supply charging current from the charging station to the at least one energy storage device during a charging operation; and a second communication control unit configured to exchange information with a first communication control unit of the electric vehicle over the course of the charging operation based on a communication between the electric vehicle and the charging station via at least one communication connection between said first and second communication control units selected from the group consisting of:

a power line communication (PLC) connection through one or more current-conducting lines of the charging cable;

a monitoring connection that is isolated from current-conducting lines in the charging cable; and a communication connection that is isolated from the charging cable;

wherein said monitoring connection indicates a plurality of states of the electric vehicle, the states include a first state, indicating that the electric vehicle is ready for charging at least one of its energy storage devices, and a second state, indicating that the at least one energy storage device of the electric vehicle is being charged via the charging cable, and wherein a change from the second state to the first state triggers an unlocking of the mechanical coupling between the terminal of the charging cable and the terminal of the charging station; and said second communication control unit being configured such that the information transmitted between the first and second communication control unit includes a signaling, generated by said first communication control unit, for unlocking the mechanical coupling.

* * * * *